United States Patent [19]

Yonemoto

[11] 4,117,382
[45] Sep. 26, 1978

[54] COMMAND SPEED SIGNAL GENERATION SYSTEM

[75] Inventor: Masashi Yonemoto, Inazawa, Japan

[73] Assignee: Mitsubishi Denki Kabushiki Kaisha, Tokyo, Japan

[21] Appl. No.: 628,248

[22] Filed: Nov. 3, 1975

[30] Foreign Application Priority Data

Nov. 7, 1974 [JP] Japan .................................. 49-128617

[51] Int. Cl.² .......................... G05B 19/02; H02P 7/18
[52] U.S. Cl. .................................... 318/163; 187/29 R
[58] Field of Search .................. 187/29; 318/162, 163, 318/164

[56] References Cited

U.S. PATENT DOCUMENTS

| | | | |
|---|---|---|---|
| 3,909,734 | 9/1975 | Palombo et al. | 318/163 |
| 3,921,046 | 11/1975 | Anzai et al. | 187/29 R |
| 3,941,214 | 3/1976 | Young et al. | 187/29 R |

OTHER PUBLICATIONS

Millman & Taub, *Pulse, Digital, and Switching Waveforms*, 1965, pp. 535-540.

Primary Examiner—Robert K. Schaefer
Assistant Examiner—Eugene S. Indyk
Attorney, Agent, or Firm—Wenderoth, Lind & Ponack

[57] ABSTRACT

A dc voltage is applied to an R-C element through a Bootstrap type linearly charging circuit to form a command speed voltage smoothly and linearly increased from its null magnitude to a constant magnitude for the acceleration of an elevator car. Upon decelerating the car, the dc voltage is decreased stepwise by successively opening serially interconnected contact sets coupled to a shortcircuit resistor and applied to a unidirectional R-C element including a diode through the linearly charging circuit. An output from the element is coupled to the stepped voltage through an R-C discharge circuit to produce from the element a command speed signal smoothly and linearly decreased to its null magnitude.

2 Claims, 6 Drawing Figures

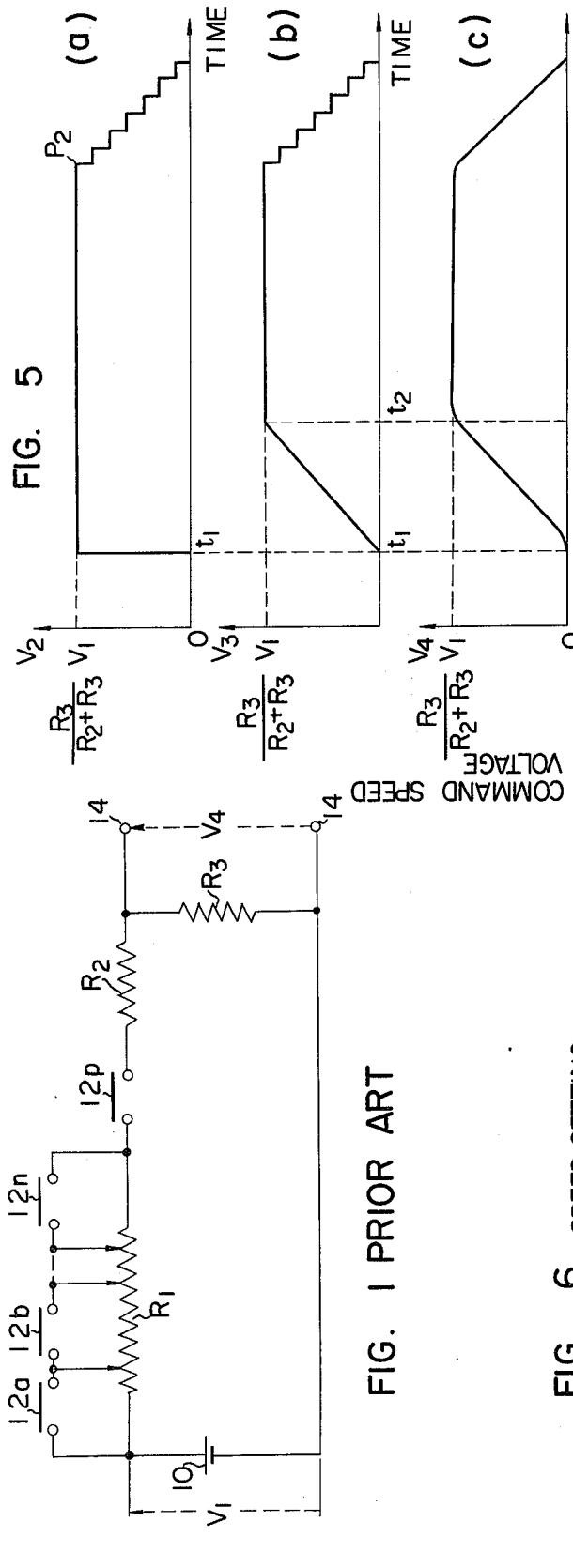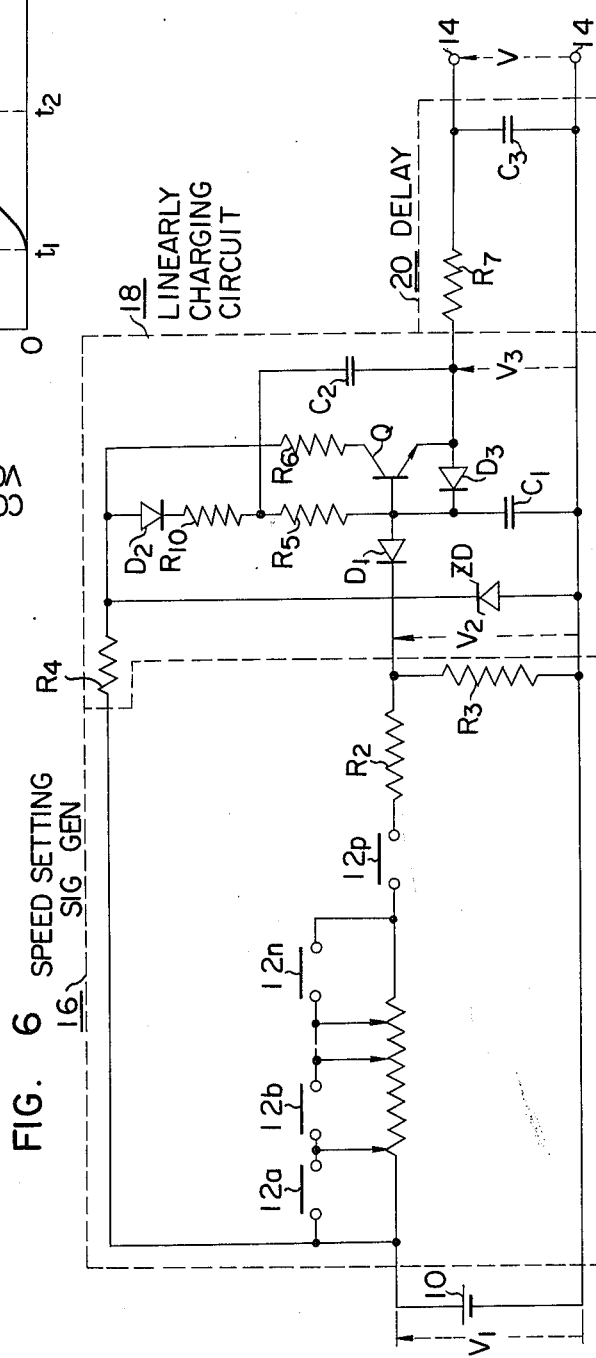

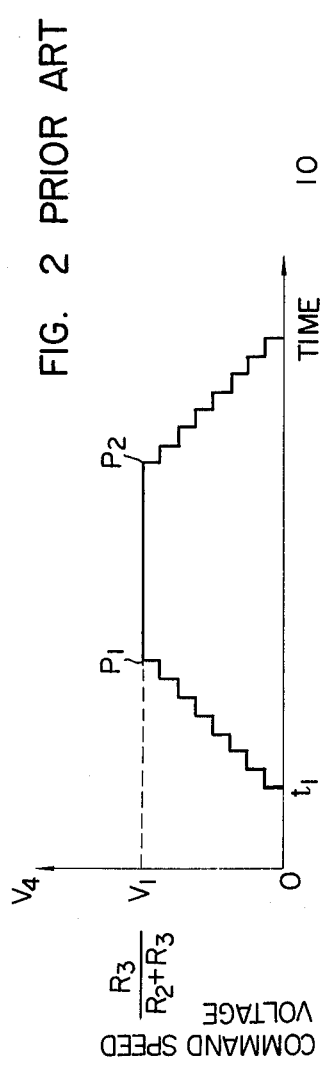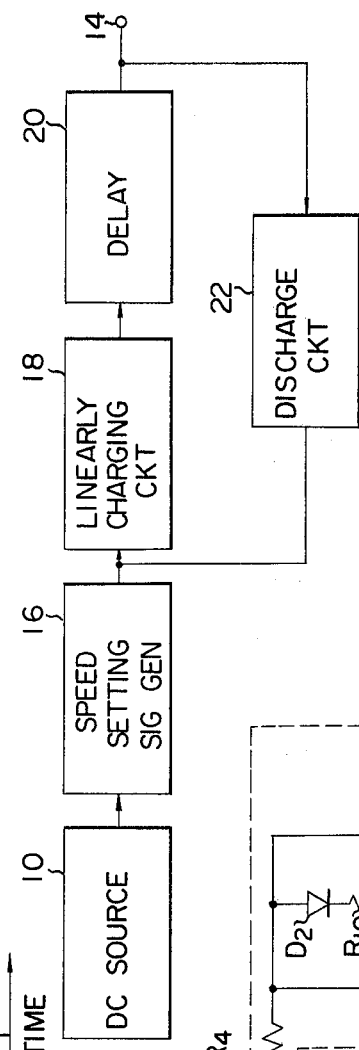

[4,117,382]

COMMAND SPEED SIGNAL GENERATION SYSTEM

BACKGROUND OF THE INVENTION

This invention relates to improvements in a system for generating a command speed signal providing a reference for controlling the speed of a moving member.

Moving members and more particularly elevator cars are operated by controlling the speed thereof in accordance with a speed reference pattern in order to provide a comfortable ride therein and improve the accuracy with which the cars are stopped at their desired positions. There are already known command speed signal generators of the type comprising three resistors serially interconnected across a source of direct current, and a series combination of a plurality of sets of normally open contacts connected across a first one of the resistors with the junctions between the contact sets connected to respective taps on the first resistor. The contact sets are responsive to a command acceleration signal to shortcircuit the first resistor in an incremental manner to produce across a third one of the resistors a voltage which is increased stepwise to a predetermined magnitude. After having been smoothed, the voltage is used to start and accelerate an associated elevator car and is maintained at the predetermined magnitude to cause the car to travel at a predetermined fixed speed. When a command deceleration signal is applied to the traveling car, the contact sets are successively opened to insert the first resistor into a circuit in an incremental manner to produce across the third resistor a voltage which is decreased stepwise to a null magnitude for stopping the car.

Since elevator cars should desirably be operated in acceleration and deceleration modes which have different characteristics from each other, it has not been easy to satisfactorily control both the acceleration and deceleration modes of operation by the contact sets as above described. Therefore it has been difficult to produce a command speed signal providing an ideally comfortable ride in elevator cars.

Accordingly it is an object of the present invention to provide a new and improved system for generating a command speed signal to provide a comfortable ride in a moving member such as an elevator car.

SUMMARY OF THE INVENTION

The present invention provides a command speed signal generation system for a moving member comprising, in combination, a source of direct current, linearly charging means connected to the source of direct current to produce an output increasing at a predetermined fixed rate of change thereof up to a voltage across the source of direct current during the acceleration of a moving member while maintaining the output at that voltage during the travel of the moving member at a predetermined fixed speed, and a time delay element connected to the linearly charging means to smooth the output waveform from the latter during the acceleration of the moving member.

In order to smooth the output waveform from the time delay element, the command speed signal generation system may further comprise speed setting signal generator means connected between the source of direct current and the linearly charging means to produce and maintain a constant output during both the acceleration of the moving member and the travel thereof at a predetermined fixed speed and independently of the position of the moving member and to gradually decrease the output in accordance with the position of the moving member during the deceleration of the latter, the time delay element being operative only in response to an increase in output from the linearly charging means, and discharge means connected between outputs of the speed setting signal generation means and the directive time delay element to smooth the output waveform from the time delay element during the deceleration of the moving member.

BRIEF DESCRIPTION OF THE DRAWINGS

The present invention will become more readily apparent from the following detailed description taken in conjunction with the accompanying drawings in which:

FIG. 1 is a schematic circuit diagram of a command speed signal generator constructed in accordance with the principles of the prior art;

FIG. 2 is a graph illustrating the output waveform from the arrangement shown in FIG. 1;

FIG. 3 is a block diagram of a command speed signal generation system constructed in accordance with the principles of the present invention;

FIG. 4 is a schematic circuit diagram of one embodiment of the command speed signal generation system according to the present invention;

FIG. 5 is a graph illustrating output waveforms developed at various points in the arrangement shown in FIG. 4; and FIG. 6 is a schematic circuit diagram of a modification of the present invention.

DESCRIPTION OF THE PREFERRED EMBODIMENTS

Referring now to the drawings, and FIG. 1 in particular, there is illustrated a command speed signal generator constructed in accordance with the principles of the prior art. The arrangement illustrated comprises a source of direct current 10 having the positive end connected to a series connected plurality of sets of normally open contacts 12a, 12b, – 12n and also to a first resistor $R_1$ subsequently connected across that series combinations of contact sets. The junctions of the adjacent contacts sets 12a, 12b, – 12n are connected to respective taps on the resistor $R_1$ and the junction of the resistor $R_1$ and the last set of contacts 12n is connected to a second resistor $R_2$ through a set of normally open contacts 12p. The second resistor $R_2$ is connected to one of two output terminals 14 and the other or negative end of the source 10 is connected to the other output terminal 14 with a third resistor $R_3$ connected across the output terminals 14.

The sets of normally open contacts 12a, 12b – 12n and 12p are adapted to be controlled by their own relays not shown.

The operation of the arrangement as shown in FIG. 1 will now be described in conjunction with FIG. 2 wherein a command speed voltage $V_1$ developed across the output terminals 14 is plotted along the ordinate against time along the abscissa. Assuming that an associated elevator car (not shown) is kept stationary to maintain all the sets of contacts 12a, 12b – 12n and 12p in their open position, the third resistor $R_3$ has no voltage applied thereacross. That is, a command speed voltage $V_4$ across the output terminals 14 has a null magnitude. When a command acceleration signal is applied to the car (not shown) at time point $t_1$ (see FIG. 2), the contact sets 12p and 12a are first closed, to shortcircuit one portion of the resistor $R_1$ thereby to slightly raise the voltage $V_4$ across the output terminals 14 as shown in FIG. 2. The car (not shown) is caused to travel so as to close the contact sets 12b – 12n one after another at appropriate time intervals to shortcircuit the first resistor $R_1$ in an incremental manner. Therefore the command speed voltage $V_4$ is increased stepwise as shown in FIG. 2 until it reaches a point $P_1$ as shown in FIG. 2 at which the voltage $V_4$ is equal to a fixed magnitude of $R_3V_1/(R_2 + R_3)$ where $V_1$ designates a voltage across the source 10 and $R_1$, $R_2$ and $R_3$ designates magnitudes of resistance of the resistors $R_1$, $R_2$ and $R_3$ respectively.

Thereafter the command speed voltage $V_4$ is maintained at the fixed magnitude as above specified to cause the car (not shown) to travel at a predetermined fixed speed.

When the elevator car (not shown) reaches a predetermined distance short of a floor at which the car is to land, a command deceleration signal is applied to the car to open the contact set 12n upon the car reaching a point $P_2$ as shown in FIG. 2. The opening of the contact set 12n permits one portion of the resistor $R_1$ to be connected in a circuit with the source 10 thereby to slightly decrease the command speed voltage $V_4$ and therefore the speed of the car. Then the car continues to travel while decelerating to successively open the remaining sets of contacts in an order reversed from that of the closure of those sets of contacts. This causes a stepped decrease in command speed voltage $V_4$ until the car lands and stops at the desired floor.

It is noted that a stepped change in voltage in both the acceleration and deceleration of the elevator car is smoothed by a secondary delay element including two capacitors and two resistors to provide a smoothed command speed voltage $V_4$ for an associated elevator car although the delay element is not illustrated in order to keep the illustration simple.

In brief, a command acceleration signal is applied to an elevator car to close the sets of contacts 12p and 12a to start the car. Then the sets of contacts 12b, – 12n are successively closed at appropriate time intervals and maintained in their closed position during the travel of the car. Upon applying a command deceleration signal to the car, the sets of contacts are successively opened in an order reversed from the abovementioned order in accordance with the position of the car. Once all the sets of contacts have been opened, they are maintained in their open position until the next command acceleration signal is applied to the car. Then the process as above described is repeated.

It will readily be understood that the acceleration and deceleration modes of operation of elevator cars, as a matter of course, have different characteristics. Therefore it is not easy to effect a satisfactory adjustment in both the acceleration and deceleration modes of operation. Thus it has been difficult to produce a command speed signal which provides an ideally comfortable ride in elevator cars.

The present invention contemplates elimination of the disadvantage of the prior art practice as above described and provides a command speed signal generation system including a combination of linear charging means and a time delay element to permit a command speed signal for the acceleration to be independent of that for the deceleration while smoothing the waveform of the command speed signal before and after the acceleration of an associated elevator car for generating a command speed signal providing a comfortable ride in an associated elevator car.

Referring now to FIG. 3, there is illustrated a command signal generation system constructed in accordance with the principles of the present invention. The arrangement illustrated comprises a source of direct current 10, a signal generator circuit 16 for generating a speed setting signal, a linear charging circuit 18 and a time delay element 20 connected in series in the named order. The time delay element 20 produces an output which is supplied to output terminal means 14 and is also connected to the signal generator circuit 16 through a discharge circuit 22.

The arrangement of FIG. 3 preferably has a circuit configuration as shown in FIG. 4. The signal generator circuit 16 is formed of the same components interconnected in the same manner as the circuit above described in conjunction with FIG. 1. Thus the components of the circuit 16 are designated by the same reference numerals and characters as the corresponding components shown in FIG. 1. However it is to be noted that the circuit 16 is different in operation from that shown in FIG. 1 only in that, in FIG. 4, the application of a command acceleration signal to an associated elevator car (not shown) causes the simultaneous closure of all the contact sets 12p, 12a, 12b, – 12n.

The source 10 having a voltage $V_1$ is connected, in addition to the connection to the set of normally open contacts 12a and the resistor $R_1$, across a series resistor $R_4$ and Zener diode ZD included in the linear charging circuit 18.

The linear charging circuit 18 further includes a semiconductor diode $D_1$ having a cathode electrode connected to the resistor $R_2$ and an anode electrode connected to a capacitor $C_1$ subsequently connected to the negative end of the source 10. The anode electrode of the diode $D_1$ is also connected to series connected resistor $R_5$ and $R_{10}$ and a semiconductor diode $D_2$ and to a base electrode of an NPN transistor Q. The diode $D_2$ has an anode electrode connected to the junction of the resistor $R_4$ and the cathode electrode of the Zener diode ZD while the transistor Q includes a collector electrode connected to the junction of the resistor $R_4$ and the anode electrode of the diode $D_2$ through a resistor $R_6$ and an emitter electrode connected to the junction of the resistors $R_5$ and $R_{10}$ through a capacitor $C_2$. The transistor Q has a semiconductor diode $D_3$ connected across the emitter and base electrodes thereof to permit a current from the emitter electrode to pass therethrough.

The linear charging circuit 18 is well known in the art and is called a "Bootstrap", circuit.

The emitter electrode of the transistor Q is connected to a resistor $R_7$ subsequently connected to one of the output terminals 14, in this case, an upper terminal 14 as viewed in FIG. 4 through a semiconductor diode $D_4$ permitting current to flow to the upper output terminal 14 therethrough. The output terminals 14 have a capacitor $C_3$ connected thereacross. The resistor $R_7$, the diode $D_4$ and the capacitor $C_3$ form the time delay element 20 which permits a current to flow therethrough only in one direction that is, from the input to the output thereof due to the presence of the diode $D_4$. The other or lower output terminal 14 is connected to the negative end of the source 10.

The junction of the diode $D_4$ and the capacitor $C_3$ is connected to the junction of the resistor $R_2$ and $R_3$ through the discharge circuit 22 including a semiconductor diode $D_5$ and resistor $R_8$ and $R_9$ connected in series with the diode $D_5$ and so poled as to permit a current from the time delay element 20 to flow to the output of signal generator circuit 16 therethrough. The discharge circuit 22 further includes a capacitor $C_4$ connecting the junction of the resistor $R_8$ and $R_9$ to a conductor extending from the negative end of the source 10 to the lower output terminal 14.

It is recalled that, with an associated elevator car (not shown) maintained stationary, all the contact sets 12a, 12b – 12n and 12p are in their open position. Under these circumstances, the resistor $R_3$ has a voltage of $V_2$ developed thereacross due to a current from the source 10 flowing through a current path traced from the positive end of the source 10 through the resistor $R_4$ the diode $D_2$ the resistor $R_{10}$, the resistor $R_5$, the diode $D_1$, the resistor $R_3$ and thence back to the negative end of the source 10. Since the resistor $R_3$ is preliminarily selected to have a magnitude of resistance extremely low as compared with the resistor $R_5$, the voltage $V_2$ across the resistor $R_3$ is sufficiently low to be regarded as substantially null. Also assuming that each of forward voltage drops across the diodes $D_1$, $D_3$ and $D_4$ is of a negligibly low magnitude, the output voltage $V_3$ (see FIG. 4) from the linear charging circuit 18 and the output voltage $V_4$ (see FIG. 4) from the delay element 20 are substantially null. Accordingly it will be appreciated that, as in the arrangement of FIG. 1, the command speed voltage $V_4$ across the output terminals 14 is null with the associated elevator car (not shown) being maintained stationary.

The operation of the arrangement as shown in FIG. 4 will now be described in conjunction with FIG. 5 wherein the voltages $V_2$, $V_3$ and $V_4$ are plotted on the ordinate against time on the abscissa. When a command acceleration signal is applied to an associated elevator car in its stopped position at a time point $t_1$ (see FIG. 5), all the contact sets 12a, 12b – 12n and 12p are simultaneously closed to shortcircuit the resistor $R_1$. Therefore a voltage $V_2$ across the resistor $R_3$ is immediately increased to a magnitude of $V_1R_3/(R_2 + R_3)$ and maintained at that magnitude as shown by waveform (a) in FIG. 5. This voltage $V_2$ is applied to the linear charging circuit 18.

Then a voltage $V_3$ developed at the emitter electrode of the transistor Q is increased at a predetermined fixed rate of change for a time interval between time points $t_1$ and $t_2$ through the operation of a Bootstrap circuit well known in the art until it reaches a magnitude of $R_3V_1/(R_2 + R_3)$ as shown by waveform (b) in FIG. 5 at time point $t_2$. After the time point the voltage $V_3$ is maintained at the magnitude of $V_1R_3/(R_2 + R_3)$ as also shown by waveform (b) in FIG. 5.

The time delay element 20 responds to the voltage $V_3$ applied thereto to produce an output voltage $V_4$ across the capacitor $C_3$ and therefore across the output terminals 14 as shown by waveform (c) in FIG. 5, assuming that the forward voltage drop across the diode $D_4$ is negligibly low. As shown by waveform (c) in FIG. 5, the output voltage $V_4$, called a command speed voltage, is rounded off or smoothed at those portions corresponding to the charge initiation and termination portions of the voltage $V_3$ and still increases at a predetermined fixed rate of change between such portions. Thereafter the command speed voltage $V_4$ is maintained at a magnitude of $V_1R_3/(R_2 + R_3)$ as shown by waveform (c) in FIG. 5.

On the other hand, the elevator car is caused to start to travel and is accelerated in response to the varying voltage $V_4$ and continues to travel at a predetermined fixed speed after the voltage $V_4$ has reached the magnitude of $V_1R_3/(R_2 + R_3)$.

When the car reaches a predetermined distance short of a floor where it is to land, a command deceleration signal is applied to the car. Then the car reaches a position corresponding to a point $P_2$ as shown in waveform (a), FIG. 5. At that time the contact set 12n is opened and then the remaining contact sets are successively opened in the order of the contact sets 12n – 12b, 12a and in accordance with the position of the car. This results in the voltage $V_2$ decreasing stepwise as shown by waveform (a) in FIG. 5. Accordingly the voltage $V_3$ also decreases in a stepped manner as shown by waveform (b) in FIG. 5.

Under these circumstances, the discharge circuit 22 is operated to change the stepped waveform of the voltage $V_3$ to a smoothed waveform of the voltage $V_4$ as shown by waveform (c) in FIG. 5 because the discharge circuit has the secondary delay characteristic. This smoothed waveform (c) from the output terminals 14 is applied to the traveling car until the latter lands and stops at the desired floor.

It is to be noted that the discharge circuit 22 is operative only during a decrease in output from the signal setting generator circuit 16 or during the deceleration of the elevator car but not during the acceleration thereof. This is because the diodes $D_4$ and $D_5$ disposed in the delay element 20 and the discharge circuit 22 respectively permit respective currents to pass only in one direction therethrough.

While it has been assumed that forward voltage drops across the diodes $D_1$, $D_3$, $D_4$ and $D_5$ are negligibly low, those forward voltage drops actually affect the command speed voltage $V_4$ for an associated elevator car which is stationary, to slightly raise the voltage $V_4$. Such a voltage may result in a starting shock. In the latter case, it is possible to raise the command speed voltage $V_4$ from its null magnitude by shortcircuiting the capacitor $C_3$ by any suitable means when the car is stationary.

The arrangement illustrated in FIG. 6 is substantially identical to that shown in FIG. 4 except for both the omission of the discharge circuit 22 with the diode $D_5$, the resistors $R_8$ and $R_9$ and the capacitor $C_4$ and the omission or shortcircuit of the diode $D_4$ included in the delay element 20. Therefore the time delay element 20 is not directive.

Since the shortcircuit of the diode $D_4$ does not impede the characteristics of the delay element, the function of smoothing the waveform of the command speed voltage $V_4$ upon either the initiation or termination of an acceleration is not affected. Therefore the arrangement of FIG. 6 can be used as means for generating a command speed signal for accelerating an associated elevator car, while separate means is used to generate a command speed signal for decelerating the car. In this case, the generator circuit 16 for generating a speed setting signal may be omitted except for the contact set 12p and the resistors $R_2$ and $R_3$.

While the present invention has been described in conjunction with an elevator car it is to be understood that the same is not restricted thereto or thereby and that it is equally applicable to moving members including apparatus for transporting passengers, the moving members requiring both a comfortable ride therein and positional accuracy for stoppage thereof.

In summary, the present invention comprises linearly charging means for producing an output increased at a predetermined fixed rate of the change thereof during the acceleration of a moving member, and maintained at an increased magnitude thereof during the travel of the moving member at a predetermined fixed speed, and a time delay element for smoothing those portions of an output waveform developed from the linearly charging means when the acceleration of the moving member is initiated and completed. Therefore the present invention can provide a comfortable ride in a moving member during the acceleration thereof.

Also, according to another form thereof, the present invention has a time delay element for directivity and uses discharge means operative only when a speed setting signal generator means involved generates a decreasing output whereby the output waveform from the linearly charging means is smoothed during the deceleration of the moving member. Therefore a comfortable ride in the moving member is provided while the acceleration and deceleration characteristics can be controlled independently of each other.

While the present invention has been illustrated and described in conjunction with a few preferred embodiments thereof it is to be understood that various changes and modifications may be resorted to without departing from the spirit and scope of the present invention.

What is claimed is:

1. A command speed signal generation system for a moving member and more particularly for an elevator car comprising, in combination,
   a source of direct current including a pair of poles;
   first resistor means connected to one of the poles of said source of direct current;
   a plurality of contact sets serially interconnected across said first resistor means, and means for simultaneously closing said plurality of contact sets during the acceleration of a moving member and for successively opening them during the deceleration thereof;
   second resistor means connected between said first resistor means and the other pole of said source of direct current;
   a Bootstrap circuit including amplifier means having an input connected to the junction of said first and second resistor means;
   a first directional element connected between said junction of said first and second resistor means and the input of said amplifier means;
   a time delay element connected to said amplifier means at the output thereof; and
   discharge means connected between the output of said time delay element and said junction of said first and second resistor means including a second directional element for causing said discharge means to operate only during the deceleration of the moving member.

2. A command speed signal generation system as claimed in claim 1 wherein said time delay element includes a directional element for causing said time delay element to operate only during the acceleration of the moving member.

* * * * *